(12) United States Patent
Whipple

(10) Patent No.: US 6,835,893 B2
(45) Date of Patent: Dec. 28, 2004

(54) BUTTON FASTENING DEVICE

(75) Inventor: Charles E. Whipple, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/756,614

(22) Filed: Jan. 13, 2004

(65) Prior Publication Data
US 2004/0161295 A1 Aug. 19, 2004

Related U.S. Application Data
(60) Provisional application No. 60/442,009, filed on Jan. 23, 2003.

(51) Int. Cl.$^7$ ................................................. H01B 7/00
(52) U.S. Cl. ...................... 174/135; 174/68.1; 248/68.1
(58) Field of Search ............................... 174/135, 84 C, 174/68.1, 68.3; 248/73, 59, 60, 68.1; 24/16 R, 17 AP

(56) References Cited

U.S. PATENT DOCUMENTS

| | | | |
|---|---|---|---|
| 2,491,290 A | * 12/1949 | Tinnerman | .................. 24/16 R |
| 3,697,667 A | 10/1972 | Pollak et al. | |
| 4,156,795 A | 5/1979 | Lacan | |
| 4,864,082 A | 9/1989 | Ono et al. | |
| 5,333,822 A | 8/1994 | Benoit et al. | |
| 5,401,905 A | 3/1995 | Lesser et al. | |
| 5,411,228 A | * 5/1995 | Morawa et al. | ......... 174/135 X |
| 5,898,134 A | 4/1999 | Fallin et al. | |
| 6,084,180 A | 7/2000 | DeBartolo, Jr. et al. | |
| 6,634,063 B2 | * 10/2003 | Joseph | ................... 174/135 X |

OTHER PUBLICATIONS www.iboco.com/mounting_inserts.htm; IBOCO ZP1–ZP2 Mounting Inserts Cable Tie Attachments, Jun. 14, 2002.

* cited by examiner

Primary Examiner—Dhiru R. Patel
(74) Attorney, Agent, or Firm—Hoffmann & Baron LLP

(57) ABSTRACT

A button fastening device for attachment within an opening in a duct base for securing elongate cables and the like as well as structural duct dividers thereto. The device includes a cup-shaped upper portion, a shaft and a locking wing. The cup-shaped upper portion has a rim for snap-on attachment of a duct divider and strap passages for attachment of a bundle strap for securing cables to the duct base. The shaft extends from the cup-shaped upper portion to the locking wing. The locking wing secures the device to the duct base.

17 Claims, 9 Drawing Sheets

BUTTON FASTENING DEVICE

CROSS-REFERENCE TO RELATED APPLICATION

This application claims priority to U.S. Provisional Patent Application No. 60/442,009, filed on Jan. 23, 2003, herein incorporated by reference.

FIELD OF THE INVENTION

The present invention relates generally to a button fastening device for securing elongated members, and dividers, plates, separating walls, or small ducts within a duct assembly or other support structure.

BACKGROUND OF THE INVENTION

Cable fasteners are typically employed in duct work, as well as, machinery, motor vehicles or other applications, in order to provide an attachment point to which electrical cable, wires, wire bundles, cables and the like may be secured. It is desirable to properly secure cables to a support structure so that the cable will not interfere with the operation of the device or other components. Proper securement is especially important when the cables or wires are located adjacent to moving components or in adverse conditions. Wires or cables if not properly restrained may become caught or entangled resulting in the wires becoming frayed or cut. Such damage to the wires or cables may lead to component failure and possibly costly troubleshooting and repair.

Space constraints of a particular design may require the wiring to be located in a specific location in order to provide clearance for other components. However, the precise ideal location of cables or wiring harnesses may only be known upon the final assembly of the wiring to the structure due to various factors that are difficult to calculate in advance. Therefore, it is desirable to have a wiring mounting device which provides location flexibility for attaching the wire harness.

The use of plastic wiring or cable ducts to convey a plurality of elongated members; such as cables, wires, pipes, hoses, electrical conductors and the like; is well known in the art. The cable duct includes a U-shaped cross section channel and a top lid as known in the art. The cables are routed loosely through the duct which impacts the amount of space available within the duct. Cable fasteners are desirable because they compact and organize the cables to efficiently utilize the limited space available within the duct and provide additional space for more wires.

Prior art wire or cable fasteners include devices which are bolted or secured to a structural member. Such devices also include an opening through which a cable tie or strap may extend. The strap then may be wrapped around the wires or cable, thereby securing the wires to the structural member. Such fasteners provide unidirectional means for securing the cable wires, typically the cables are fastenable only in the direction in which the structural member runs. However, if one desires a portion of the cables to run 90° from the rest of the cables, the fasteners do not provide for multidirectional securement. Typically, the portion of the cables is pulled from the bundle of cables and running loosely to the desired location.

In addition to space constraints, separation of cables may be required, for example, a separation of circuits with different voltages and/or functions. This is often achieved by dividing the duct with a separating wall within the duct, or by mounting a smaller sized duct within the larger duct. Prior art separating walls or dividers include devices which are integral with the duct base and/or cover; or removably attached.

One example of an integrally attached divider is disclosed in U.S. Pat. No. 6,084,180 to DeBartolo, Jr., et al. This patent discloses a multi-channel duct for enclosing conductors, cables, wires, power lines, communication lines and the like. The multi-channel duct includes an elongated base with an inner cover integrally formed with the divider dividing the base into two channels, and an outer cover overlying both channels. The multi-channel duct is prefabricated having a pre-formed divider within the duct which does not provide for the adjustment of channel size or number of channels.

A removably attached divider offers more versatility then the integrally attached divider by providing for flexibility in divider placement. Typically a removably attached divider is attached to a support structure by engaging with a pre-formed groove in the support structure. One example of a removable separator wall is disclosed in U.S. Pat. No. 3,697,667 which discloses a channel having longitudinally extending grooves in which separating bars can be placed which serve to form electronically separated chambers in the channel. Such chambers are predetermined by the grooves pre-formed during the manufacturing of the channel. Typically, the grooves run the length of the duct. The flexibility is limited regarding the number of chambers, the size of the chambers, and the direction of the dividers, such as diagonally across the duct, alternating locations through the duct, or across the duct. In addition, the removable dividing walls are difficult to install and remove because the dividers must slidably connect with the elongated groove the length of the divider.

An alternative to the dividing wall is a smaller channel which is mounted within a larger channel as seen in http://www.iboco.com/mounting-inserts.htm ZP1 mounting inserts made by IBOCO®). The smaller channel is mounted within the larger channel using a three part attachment system. The mounting inserts from IBOCO®, (ZP1) eliminates the problems associated with engaging a dividing wall along the entire preformed elongated groove in the channel, however, the mounting inserts requires multiple connector pieces to mount the smaller channel. Two connector pieces must be mounted to the support structure prior to mounting the smaller channel and the third connector piece. Multiple mounting pieces complicate and increase installation time of the dividing wall. In addition, difference connector pieces must be used when installing a divider wall or cable fastening connectors.

Accordingly, it is desirable to provide a cable fastener that may be securely fastened to a support structure and securely accommodate a variety of cable locations, and provide multi-directional bundling capabilities. Additionally, it is desirable for the same cable fastener to be used to mount divider walls at various locations providing multiple chambers within the channels. It is further desirable to provide a cable fastener which is simple, efficient to install and a single connector piece which can be used for both divider wall installation and cable fastening in combination or independently.

SUMMARY OF THE INVENTION

The present invention provides a button fastening device which secures to a support structure, such as a duct base, and provides multi-directional bundling capabilities.

Additionally, the button fastening device of the present invention may be used for attachement of duct dividers and/or bundling straps to secure cables to a support structure.

The button fastening device of the present invention is for attachment within an opening in the duct base. The device includes a cup-shaped upper portion, a shaft and a locking wing. The cup-shaped upper portion has an upper surface defining an extending rim, an opposed bottom surface and a cylindrical side wall recessed from the rim and extending between the upper surface and the bottom surface. The rim provides for snap-on attachment of a duct divider, and the side wall has a strap passage therethrough for accommodating a bundling strap for securing the cables to the duct base. The shaft depends from the bottom surface of the cup-shaped upper portion for insertion into the opening in the duct base. The locking wing extends from the shaft spaced from the bottom surface of the cup-shaped upper potion.

In another embodiment the button fastening device of the present invention is similar to the above-described device further including an elongated shaft having a frictional engagement surface for engaging a wall of the opening.

DETAILED DESCRIPTION OF THE PREFERRED EMBODIMENTS

Various support structures are used to supportively hold cables and wires in place. Examples of support structures include beams, pipes, building supports, automotive body components, instrument panels, duct assemblies and the like. The type of support structure used depends upon the application. Herein described is a duct assembly application but one can appreciate the following equally applies to other support structures.

Figure 5:
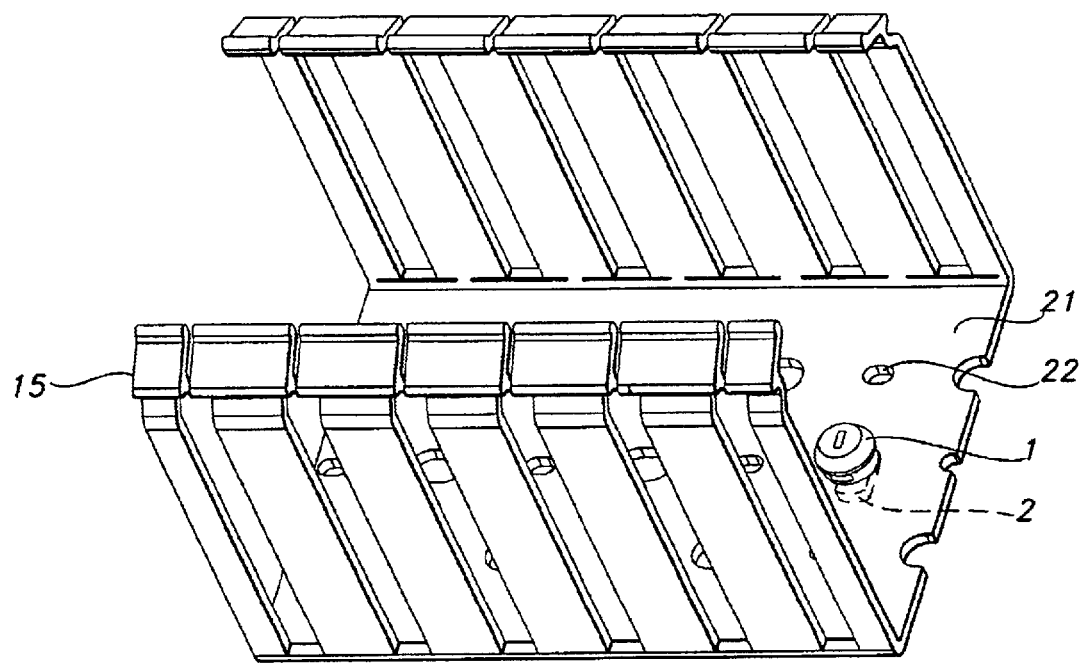
FIG. 5 is a perspective view of a duct base including a button fastening device of the present invention.
Figure 7:
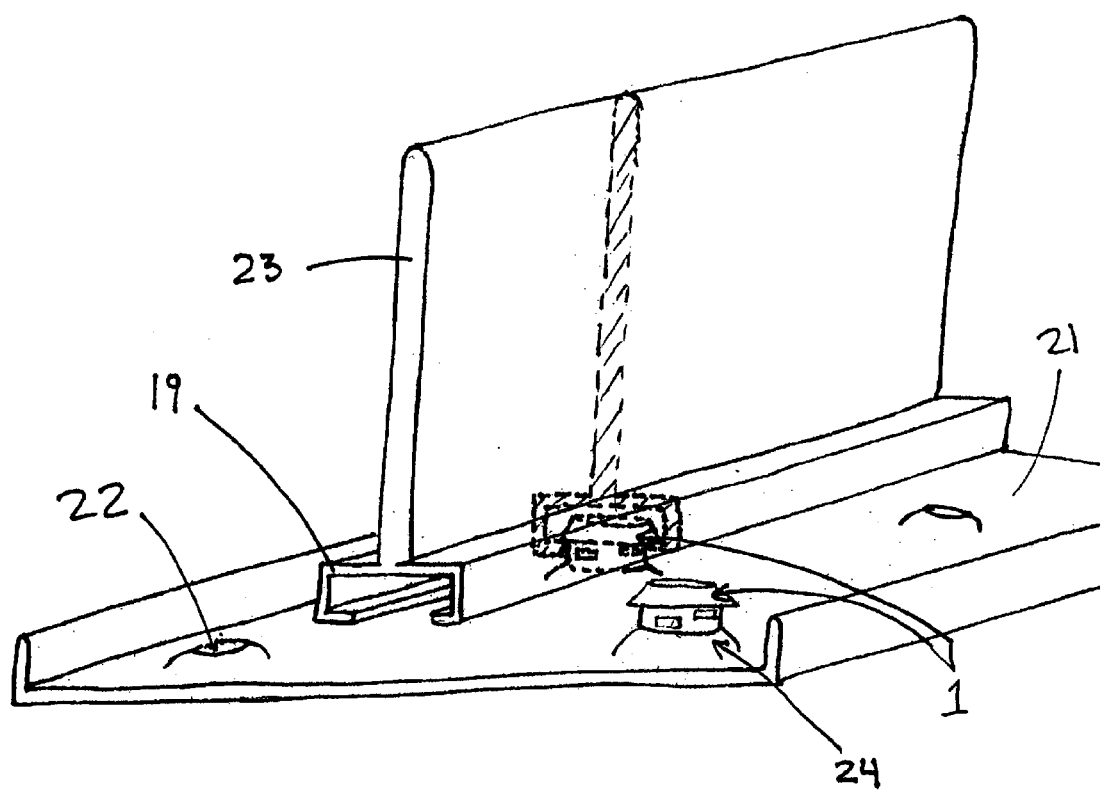
FIG. 7 is a top perspective view of a button fastening device of FIG. 1 engaging a duct base with a divider wall.
Figure 9:
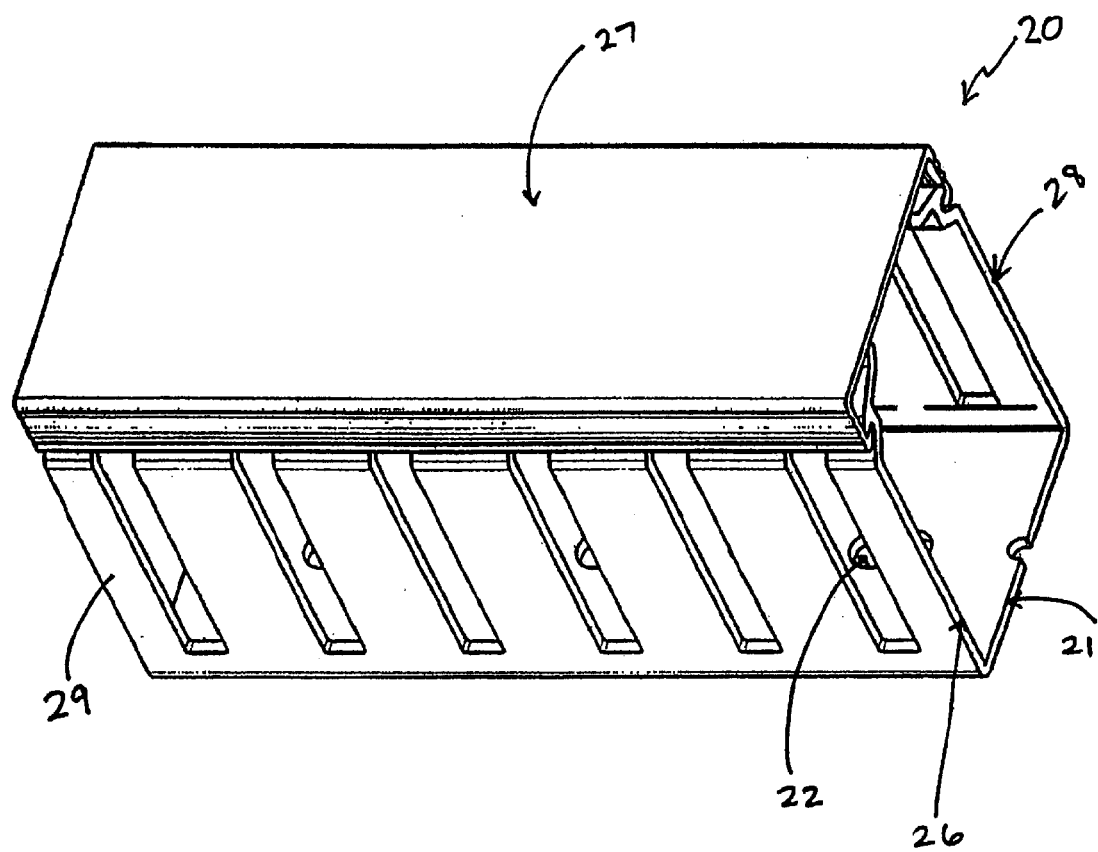
FIG. 9 is a perspective view of a duct assembly as known in the art.

Referring to FIG. 9, a duct assembly 15 for supporting wires and cables is shown. Duct assembly 15 includes a duct portion 26 and a cover 27 which latches or is attached to the duct portion 26. Generally, the duct portion 26 of the duct assembly 15 is defined by a U-shaped channel, with a duct base 21 and a pair of side walls 28 and 29 attached to the duct base 21. The duct base 21 is mounted to a support panel, or building support structure by means such as screws passed through mounting apertures in the duct base 21. As shown in FIGS. 5 and 7, the duct base 21 further includes numerous attachment apertures 22, which are preferably beveled, for mounting attachments, such as a button fastening device 1 of the present invention, to the interior of the duct assembly 15. A plurality of elongated members, such as cables, wires, pipes, hoses, electrical conductors and the like, is routed through the duct assembly 15 such as to establish electrical connections between diverse elements of the electrical installation.

Figure 8:
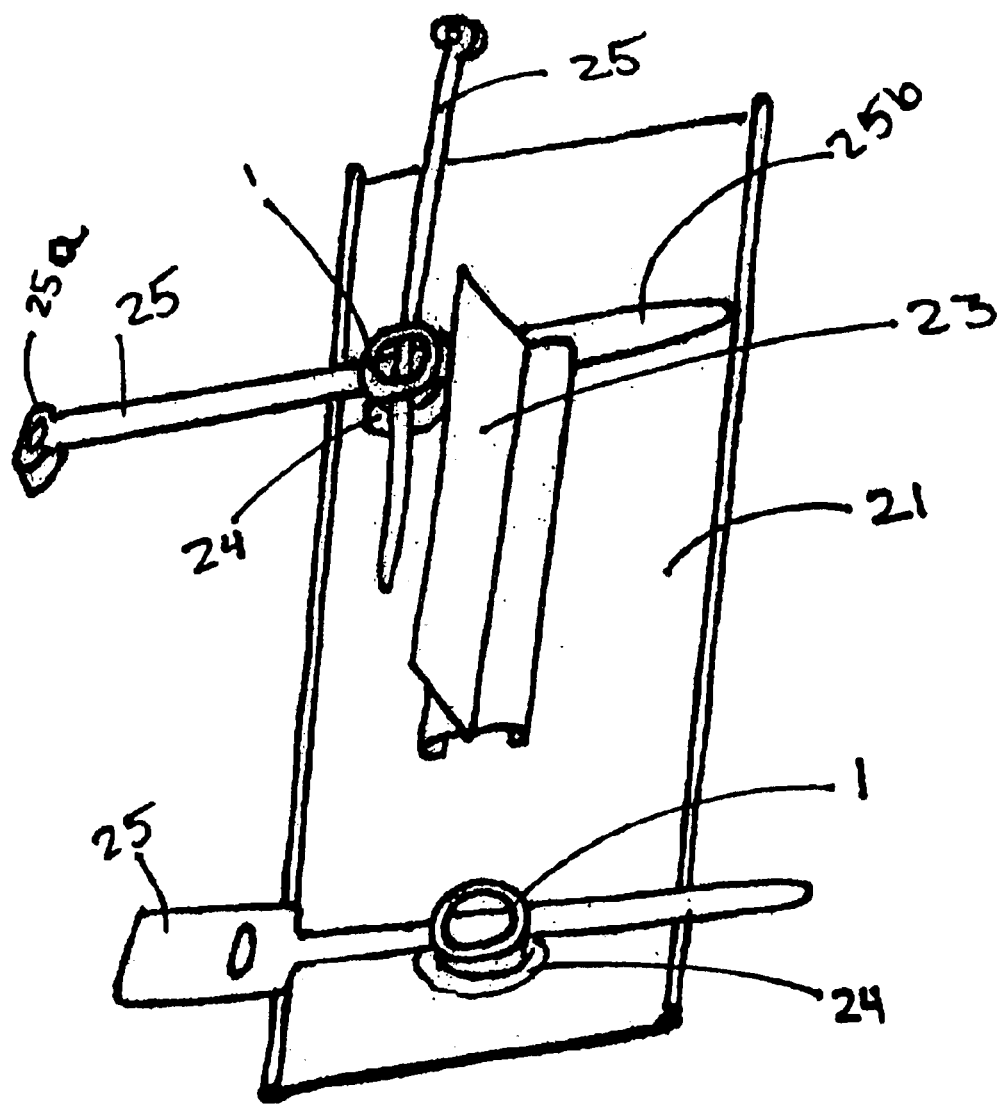
FIG. 8 is a top perspective view of a button fastening device of FIG. 1 engaging various components with a duct base.

As known in the art, cable ties have long been used in the electrical industry to bundle a plurality of cables or articles. A typical cable tie 25, such as that shown in FIG. 8, includes a locking head 25a at one end and an elongate strap 25b extending from the head. The tail of the strap is inserted through an opening in the head, where an appropriate locking device locks the cable tie around the bundle of articles. Referring to FIG. 8, where it is desired to secure cables to the duct base 21 a cable tie 25 is used in conjunction with a button fastening device 1.

In addition, where it is desirable to separate the elongated members, for example cables of different voltages and/or functions, a dividing member 23 is used to divide the interior of the duct assembly 15 into multiple channels, as shown in FIG. 7. Dividing members 23 are known in the art and include plates, walls, separators, smaller ducts and the like. Dividers 23 include a planar surface attached at one end to a bracket base 19. The bracket base 19 may be employed to secure the divider 23 to the duct base 21.

In order to fasten carrier components, such as wires and cables, as well as dividing member 23 to duct base 21 an improved fastening device 1 is provided. A button fastening device 1 of the present invention is shown in FIGS. 1–4. The button fastening device includes a stemware-structure housing which has a cup portion 12, a shaft portion 3 and a wing locking portion 2. The cup portion 12 includes a cylindrical sidewall 4, a bottom surface 5 and an open upper end 13 defining an interior 9 of the cup portion 12. The bottom surface 5 further has a centrally located access opening 11 therein. The access opening 11 is for receiving a tool such as a screwdriver for turning the device a quarter-turn to lock the button fastening device 1 against the duct base 21 as will be described. The open upper end 13 of side wall 4 includes a lead-in rim 8 there about. The lead-in rim 8 extends outwardly beyond the outer surface of the sidewall 4 creating a lip between the lead-in rim 8 and the side wall 4. The lead-in rim 8 projects slightly inward, and is conical in shape to provide lead-in geometry for snap-on attachment of a divider wall 23 as will be described below. Even though herein described the cup portion 12 is generally cylindrical in shape, it can be appreciated by one skilled in the art that the cup portion 12 is not limited to a cylindrical shape and may be square, oval, rectangular and the like.

Figure 6:
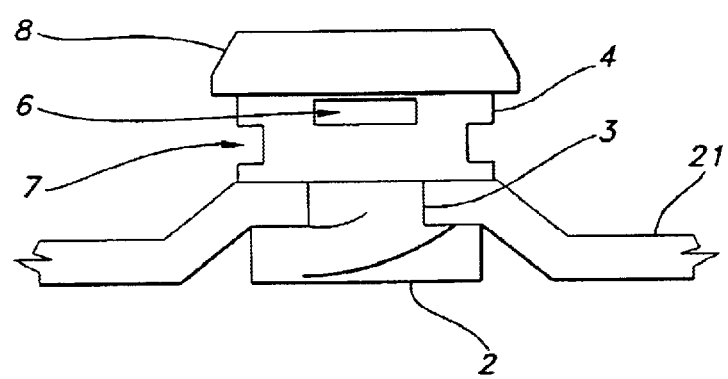
FIG. 6 is a partial side view of a button fastening device of the present invention engaged with a duct base.

The side wall 4 includes two pairs of slots 6 and 7 extending therethrough. Each pair of slots 6 and 7 includes diametrically opposed slots 6a, 6b and 7a, 7b. The slots 6 and 7 are designed to accommodate cable ties or similar fastener devices therethrough as shown in FIG. 8. The arrangement of slots 6 and 7 allow a pair of cable ties to be passed through button fastening device 1 without interference. The slots 6 and 7 can be located at various locations on the side wall 4. In the present example slots 6 are located adjacent to the upper end 13 of the cup portion 12 while slots 7 are located adjacent to the bottom surface 5. As shown in FIG. 6, the pairs of slots 6 and 7 are offset 90°.

Figure 1:
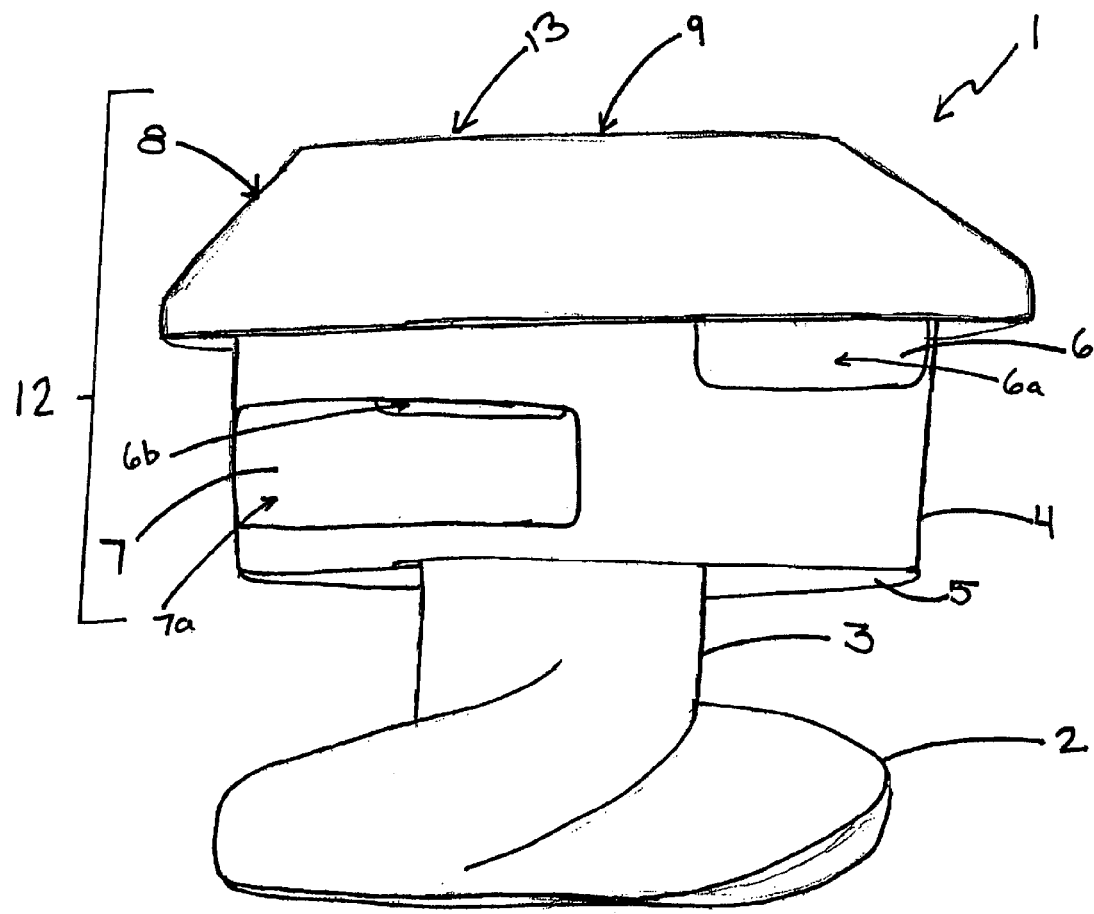
FIG. 1 is a side perspective view of a button fastening device of the present invention having a circular shaft.
Figure 2:
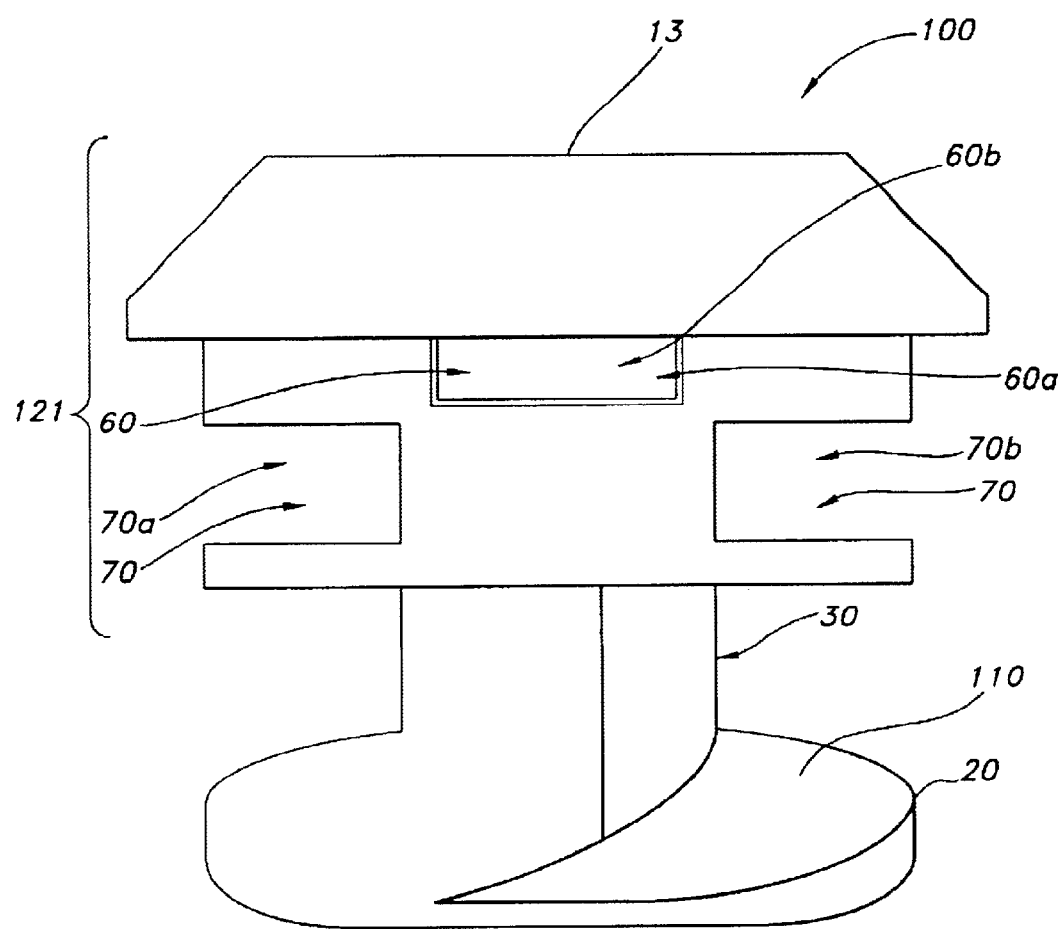
FIG. 2 is a side perspective view of a button fastening device of the present invention having a square shaft.
Figure 3:
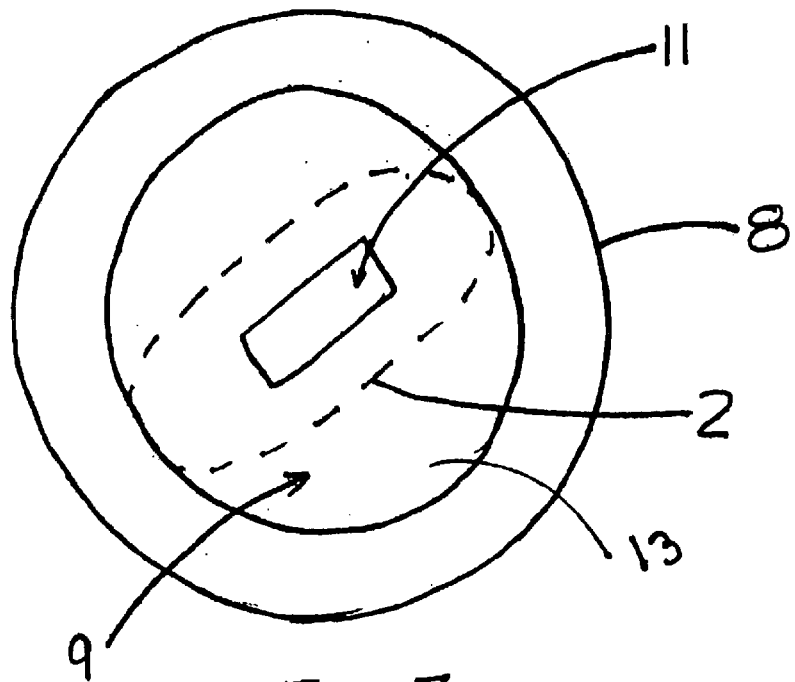
FIG. 3 is a top perspective view of a button fastening device of FIG. 1 showing the locking hole.
Figure 4:
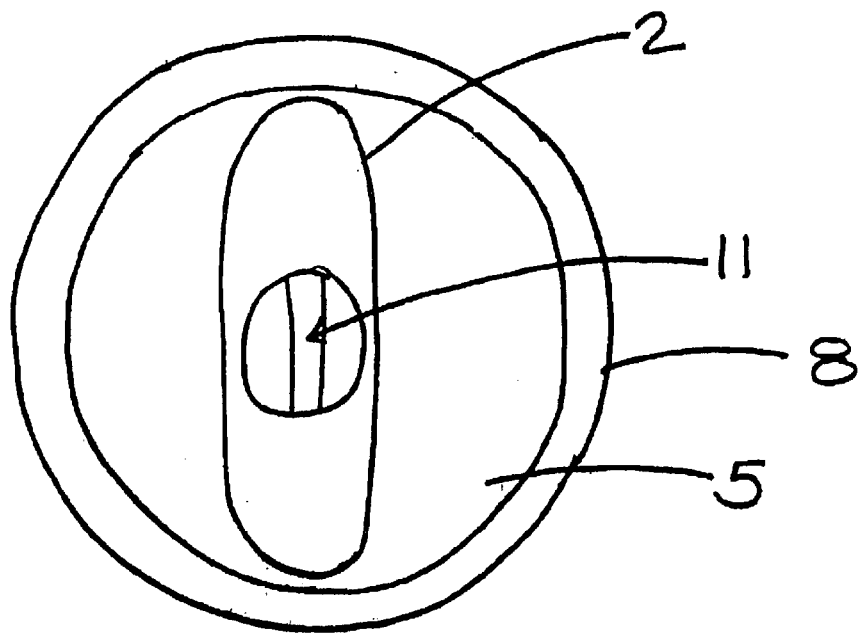
FIG. 4 is a bottom perspective view of a button fastening device of FIG. 1 showing a footprint of the wing base.
Figure 10:
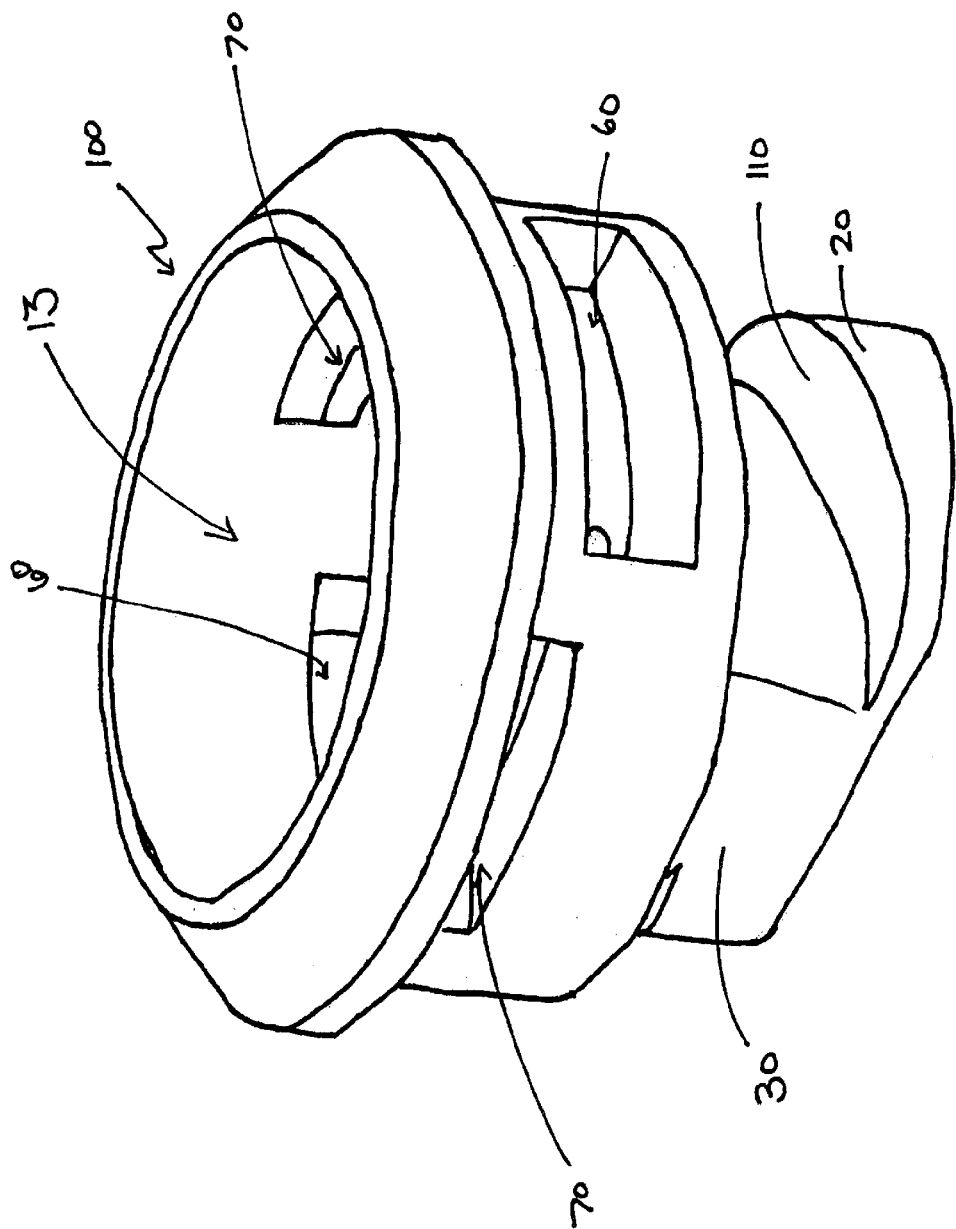
FIG. 10 is a side perspective view of a button fastening device of the present invention having a square shaft.

Additionally, as shown in FIGS. 1–4, button fastening device 1 includes both shaft 3 connected to cup portion 12. The shaft 3 protrudes perpendicularly from the bottom surface 5 to the wing locking portion 2 which is also perpendicularly and integrally connected to the shaft 3. The shaft 3 thickness is about equal to or slightly smaller then the width of the apertures 22 in the duct base 21, such that the shaft can slip through the aperture without deforming or weakening the shaft 3 when twisting the button fastening device 1, locking it in place. The length of the shaft 3 is preferably about the thickness of the support structure in which the button fastening device 1 is used, in the case of a typical duct base the shaft 3 is about 0.05 to about 0.10 inches long, preferably 0.07 to about 0.09 inches, more preferably 0.075 to about 0.08 inches. The shaft 3 is of hollow construction as shown in FIG. 4, but is not limited to the hollow construction. The shaft 3 may be cylindrical in shape as shown in FIG. 1. The shaft may be square in shape as shown in FIGS. 2 and 10. It can be appreciated by those skilled in the art that the shaft may be various shapes such as square, as shown in FIGS. 2 and 10, hexagonal, octagonal, and the like, as well as being of solid construction.

As shown in FIG. 7, the lip of the rim 8 is for receiving a dividing wall 23. The dividing wall 23 has a bracket base 19 with an aperture which allows the dividing wall to snap over the lead-in rim 8. The bracket base 19 rests on side wall 4 of the cup portion 12, engaging with the lead-in rim 8 to secure the dividing wall 23 to the duct base 21. The bracket base 19 of dividing wall 23 wraps around the lead-in rim 8 of the button fastening device 1, preventing vertical removal of the dividing wall 23. The dimensions of the lead-in rim 8 and the side wall 4 of the cup portion 12 is constrained by the type of divider wall 23 and width of the aperture of the bracket base 19, or other attachment means of the divider wall 23. The outside diameter of the side wall 4 ranges from slightly larger than the aperture of the bracket base 19 to about the size of the aperture 22 on the duct base 21. The lead-in rim 8 is slightly larger than the aperture of the bracket base 19 without being so large that one can not snap the dividing wall 23 over the lead-in rim 8.

As shown in FIG. 4, the bottom view of the button fastening device 1, the wing locking portion 2 is has an oval footprint, or ellipse cross-section shape, but is not limited to the oval shape, it may be rectangular or other suitable shapes. Generally, the footprint of the wing portion 2 must be small enough in width to fit into an aperture 22 of the base duct 21, as shown in FIGS. 5 and 6. In addition, FIGS. 2 and 10 show the tapered structure 110 of the wing locking portion 2 which is tapered twisting toward either side of the shaft 3. The ends of the wing locking portion 2 which extend on either side of the shaft twist about the shaft 3 in a helical configuration. Each end of the wing locking portion 2 twist helically about the shaft 3 in opposing direction as shown in FIGS. 1 and 2. This tapered structure 110 locks the button fastening device 1 in place in the aperture 22 of the duct base 21 upon turning the button fastening device 1 a quarter-turn. The tapered structure 110 allows the device 1 to lock without deformation of the shaft 3. The button fastening device 1 is locked in place by use of a tool in the locking hole 11 of the cup portion 12, which engages the button fastening device 1 for turning. Generally, the button fastening device 1 may be made of a variety of materials which are strong enough to support a dividing wall 23, and cables supported thereto, and withstand the twisting of the device 1 to lock in place. Suitable materials include polymers, such as polycarbonate, and synthetic materials, such as nylon.

A further embodiment as shown in FIGS. 2 and 10 is a button fastening device 100 which is substantially similar to the device 1 in FIG. 1. Button fastening device 100 includes a cup portion 121, a shaft 30, and a wing locking portion 20. Cup portion 121 is similar to cup portion 12 of FIG. 1. The cup portion 121 includes a pair of slots 60 and 70. The slots 60 and 70 include diametrically opposed slots 60a, 60b and 70a, 70b.

Figure 11:
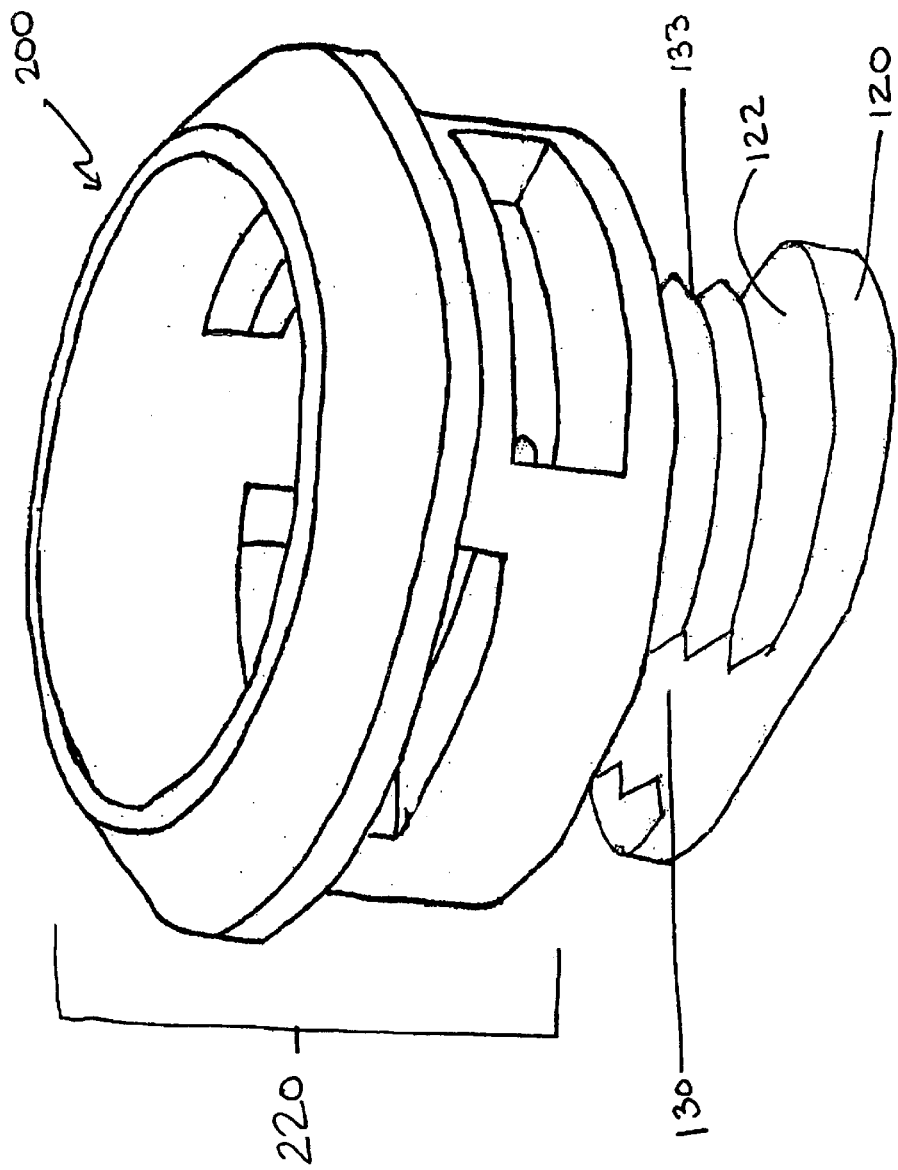
FIG. 11 is a side perspective view of a button fastening device of the present invention having a frictional engagement surface on a portion of the shaft surface.
Figure 2:
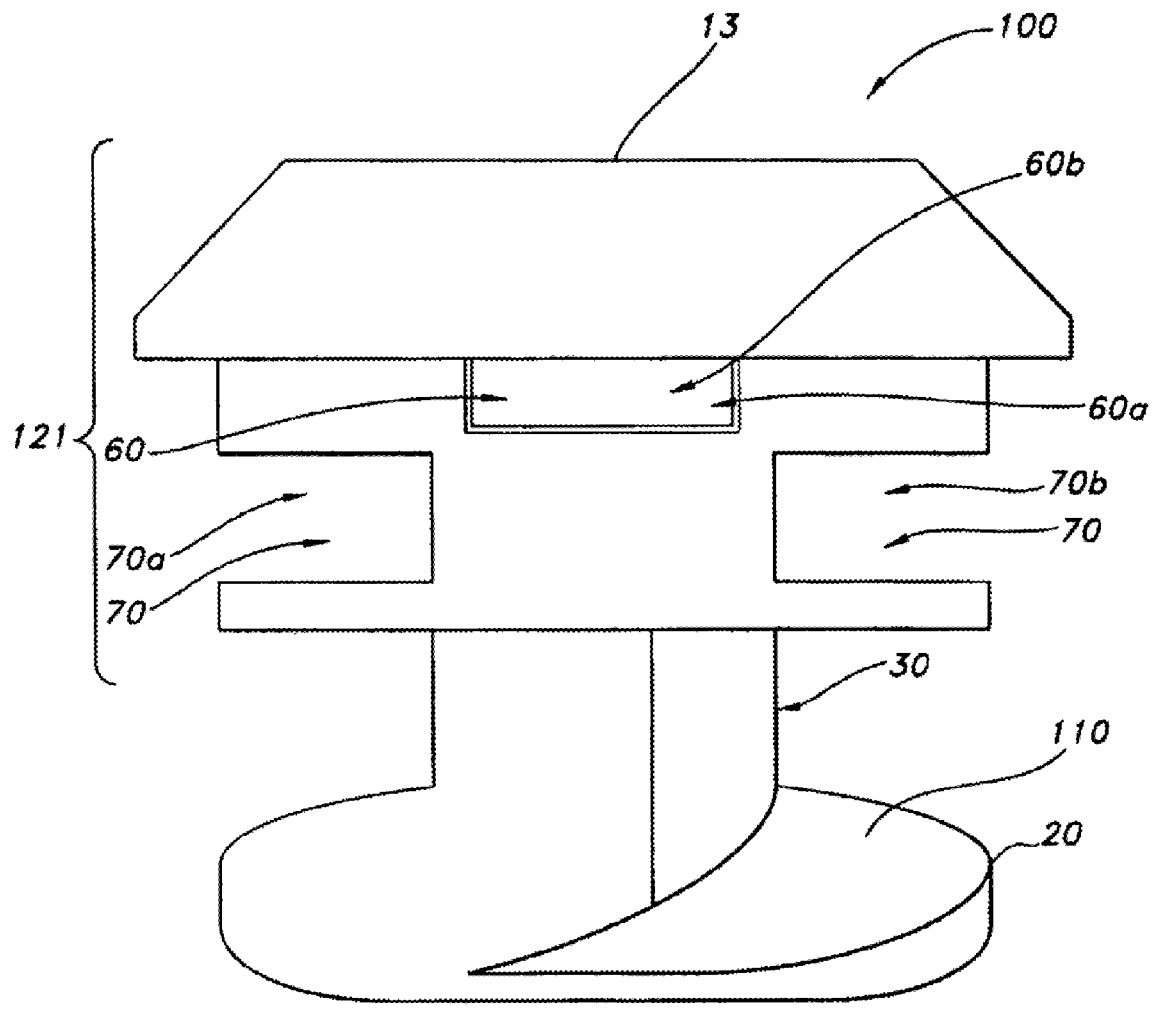
Figure 5:
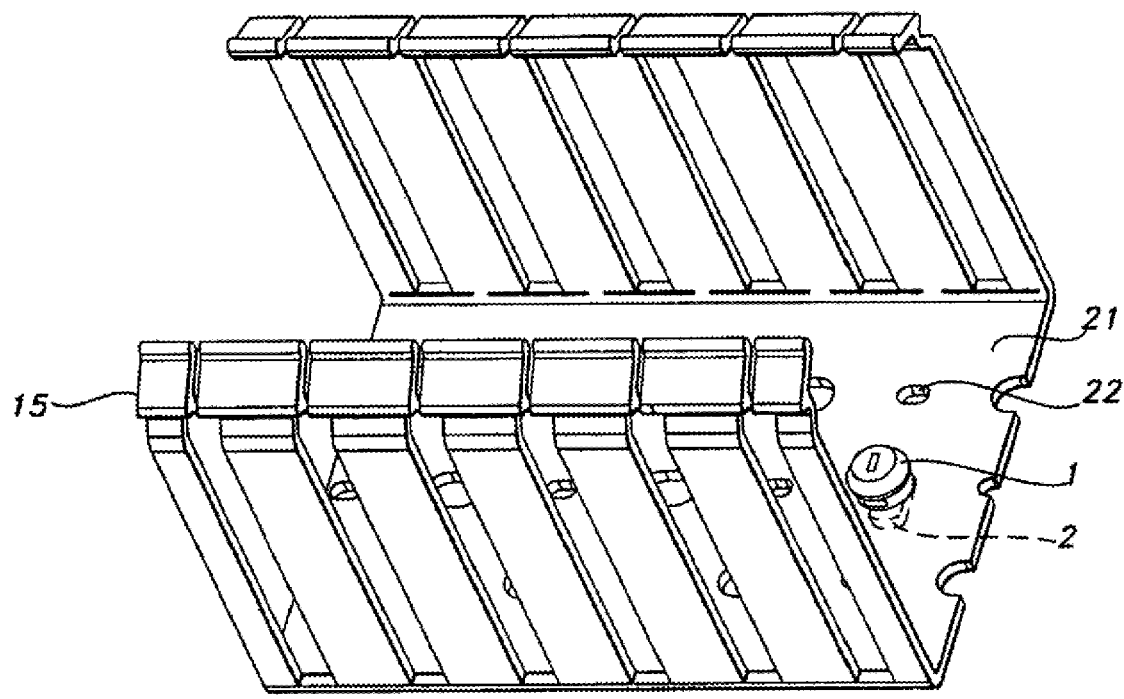
Figure 6:
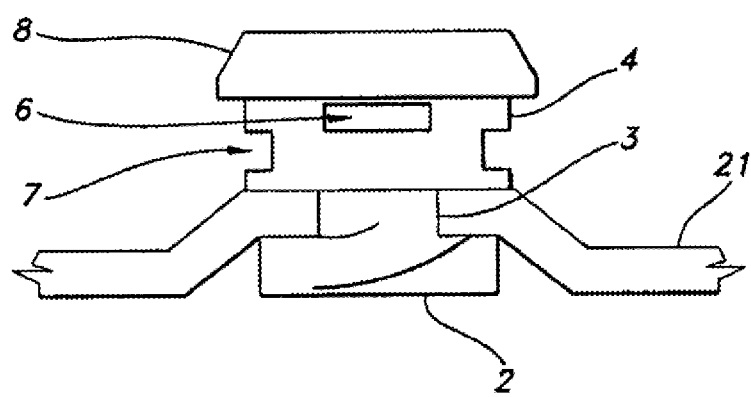
Figure 9:
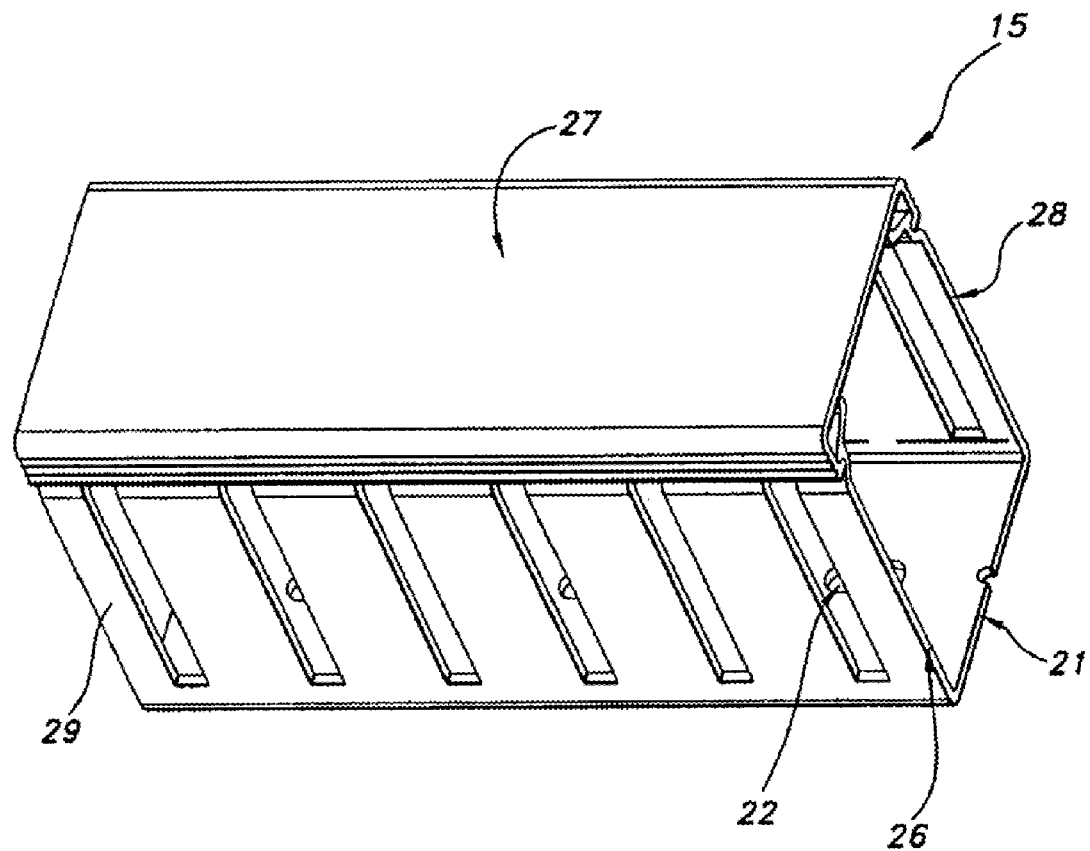

Another embodiment shown in FIG. 11 is a button fastening device 200 which is substantially similar to the device 100 shown in FIGS. 2 and 10. Button fastening device 200 includes a cup portion 220, a shaft 130, and a wing locking portion 120. The shape of the shaft 130 is cylindrical with a substantially oval or ellipse cross-sectional area. Shaft 130 has a frictional engagement surface 133 on a portion of the surface of the shaft 130. Unlike the prior embodiments which show a substantially smooth surface such as the one described in FIGS. 1–4 and 10. Frictional engagement surface 133 is an uneven surface on the shaft 130 surface which engages with the walls of the aperture of the duct base to provide additional frictional securement of the device within the aperture.

Further, it can be appreciated by those skilled in the art that the shaft 130 may have various cross-sectional shapes, such as circular, square, hexagonal, octagonal and the like. The frictional engagement surface 133 may be present on any portion of the shaft 130 surface or on the entire surface. FIG. 11 shows the frictional engagement surface 133 on the curved surface portions of the substantial elliptical shaft 130.

Furthermore, the frictional engagement surface 133 can be a variety of shapes and sizes, and may vary along the shaft 130. FIG. 11 shows the frictional engagement surface 133 as a series of substantially similar elongated troughs and peaks, such as a screw thread construction. However, the one can appreciate the uneven surface of the frictional engagement surface 133 can be a variety of different shaped protuberances, such as bumps, raised diagonal slashes, random peaks, and the like, and combinations thereof. Further, the size and shape of the uneven surface of the shaft may vary across the shaft surface. For example, a portion of the shaft may include protuberances and a portion of the shaft may include elongated peaks.

The wing locking portion 120 is similar to the previously described embodiments having a footprint of the wing portion 120 small enough to fit into an aperture of the base duct and large enough to interlock with the base upon a quarter turn. The wing locking portion 120 has a planar top surface 122 instead of the tapered opposing helically twisting structures of the previously described embodiments, such as tapered structure 110 of FIG. 10. However, it can be appreciated that the wing locking portion 120 may include various structures, such as a tapered structure, uneven surface, protuberances, roughened surface, frictional engagement surface and the like without departing from the contemplated scope of the invention.

Having described particular arrangements of the present invention herein, it should be appreciated by those skilled in the art that modifications may be made thereto without departing from the contemplated scope thereof. Accordingly, the arrangements described herein are intended to be illustrative rather than limiting, the scope of the invention being set forth in the claims appended hereto.

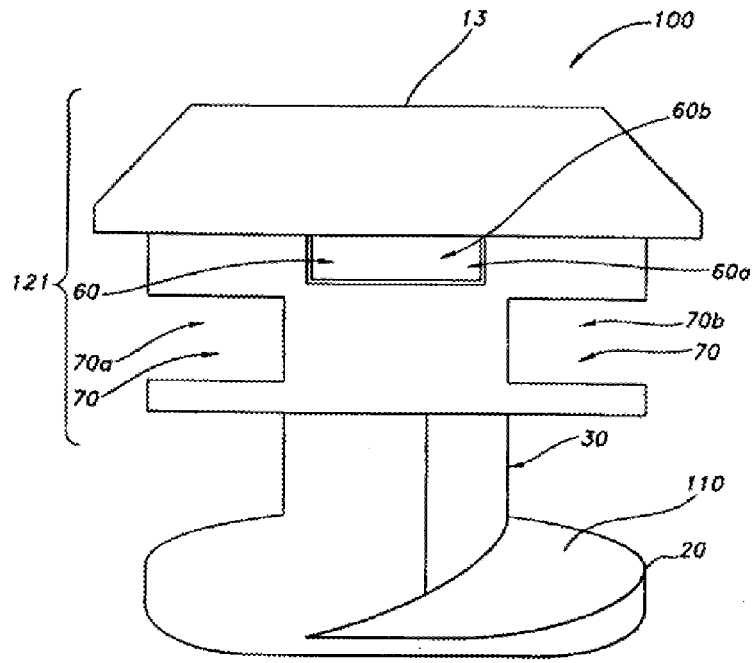

What is claimed is:

1. A button fastening device for attachment within an opening in a duct base for securing elongate cables and wires as well as structural duct dividers thereto, said device comprising:

a cup-shaped upper portion having an upper surface defining an extending rim, an opposed bottom surface and a cylindrical side wall recessed from said rim and extending between said upper surface and said bottom surface; said rim providing for snap-on attachment of said structural duct divider; said side wall including a slot therethrough for accommodating a bundling strap for securing said cables to said duct base;

an elongate shaft depending from said bottom surface for insertion into said opening in said duct base; and a locking wing extending from said shaft spaced from said bottom surface of said upper portion.

2. The device of claim 1, wherein said locking wing having a ramped upper surface for locking engagement within said opening of said duct base.

3. The device of claim 1, wherein said side wall including two pairs of slots, each pair of slots being offset 90° from each other.

4. The device of claim 1, wherein said locking wing having an elongated shape.

5. The device of claim 4, wherein said elongated shape is substantially an ellipse.

6. The device of claim 1, wherein said button fastening device is formed from a polymer.

7. The device of claim 1, wherein said button fastening device is formed from polycarbonate.

8. A button fastening device for attachment within an opening in a duct base for securing elongate cables and wires as well as structural duct dividers thereto, said device comprising:

a cup-shaped upper portion having an upper surface defining an extending rim, an opposed bottom surface and a cylindrical side wall recessed from said rim and extending between said upper surface and said bottom surface; said rim providing for snap-on attachment of said structural duct divider; said side wall including a slot therethrough for accommodating a bundling strap for securing said cables to said duct base;

an elongate shaft depending from said bottom surface for insertion into said opening in said duct base, said shaft having a fictional engagement surface for engaging a wall of said opening; and a locking wing extending from said shaft and spaced from said bottom surface of said upper portion.

9. The device of claim 8, wherein said side wall including two pairs of slots, each pair of slots being offset 90° from each other.

10. The device of claim 8, wherein said locking wing having an elongated shape.

11. The device of claim 8, said locking wing having a ramped upper surface for locking engagement within said opening of said duct base.

12. The device of claim 8, wherein said locking wing having a planar upper surface.

13. The device of claim 8, said shaft having a substantially ellipse cross-sectional shape.

14. The device of claim 13, wherein said shaft having screw thread construction on curved sections of said ellipse shape of said shaft and smooth surface on linear sections of said ellipse shape of said shaft.

15. The device of claim 8, wherein said frictional surface of said shaft comprising a screw thread configuration.

16. The device of claim 8, wherein said button fastening device is formed from a polymer.

17. The device of claim 8, wherein said button fastening device is formed from polycarbonate.

* * * * *

UNITED STATES PATENT AND TRADEMARK OFFICE
CERTIFICATE OF CORRECTION

PATENT NO. : 6,835,893 B2  Page 1 of 5
APPLICATION NO. : 10/756614
DATED : December 28, 2004
INVENTOR(S) : Whipple It is certified that error appears in the above-identified patent and that said Letters Patent is hereby corrected as shown below:

The title page showing the illustrative figure should be deleted to be replaced with the attached title page.

Drawing sheets, consisting of figs. 2, 5, 6 and 9, should be deleted to be replaced with the drawing sheets, consisting of figs. 2, 5, 6 and 9, as shown on the attached pages.

At column 2, lines 48, the printed patent incorrectly reads "In addition, difference connector pieces"; the patent should read --In addition, different connector pieces--.

At column 5, lines 43, the printed patent incorrectly reads "...portion 2 is has an oval footprint..."; the patent should read --portion 2 has an oval footprint--.

At column 6, line 35, the printed patent incorrectly reads "However, the one can appreciate..."; the patent should read --However, one can appreciate--.

At column 8, line 21 (claim 13), the printed patent incorrectly reads "...claim 8, said shaft..."; the patent should read --claim 8, wherein said shaft--.

At sheet 7 of 9, drawing figure 9, the printed patent incorrectly indicates reference number "20"; the patent should indicate reference number --15--.

Signed and Sealed this

Nineteenth Day of February, 2008

JON W. DUDAS
*Director of the United States Patent and Trademark Office*

(12) United States Patent
Whipple

(10) Patent No.: US 6,835,893 B2
(45) Date of Patent: Dec. 28, 2004

(54) BUTTON FASTENING DEVICE

(75) Inventor: Charles E. Whipple, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/756,614

(22) Filed: Jan. 13, 2004

(65) Prior Publication Data

US 2004/0161295 A1 Aug. 19, 2004

Related U.S. Application Data

(60) Provisional application No. 60/442,009, filed on Jan. 23, 2003.

(51) Int. Cl.$^7$ .................................. H01B 7/00
(52) U.S. Cl. ............... 174/135; 174/68.1; 248/68.1
(58) Field of Search ................. 174/135, 84 C, 174/68.1, 68.3; 248/73, 59, 60, 68.1; 24/16 R, 17 AP

(56) References Cited

U.S. PATENT DOCUMENTS

| | | | |
|---|---|---|---|
| 2,491,290 A | * | 12/1949 | Timmerman ............ 24/16 R |
| 3,697,667 A | | 10/1972 | Pollak et al. |
| 4,156,795 A | | 5/1979 | Lacan |
| 4,864,082 A | | 9/1989 | Ono et al. |
| 5,333,822 A | | 8/1994 | Benoit et al. |
| 5,401,905 A | | 3/1995 | Lesser et al. |
| 5,411,228 A | * | 5/1995 | Morawa et al. ......... 174/135 X |
| 5,898,134 A | | 4/1999 | Fallin et al. |
| 6,084,180 A | | 7/2000 | DeBartolo, Jr. et al. |
| 6,634,063 B2 | * | 10/2003 | Joseph ................. 174/135 X |

OTHER PUBLICATIONS www.iboco.com/mounting_inserts.htm; IBOCO ZP1–ZP2 Mounting Inserts Cable Tie Attachments, Jun. 14, 2002.

* cited by examiner

Primary Examiner—Dhiru R. Patel
(74) Attorney, Agent, or Firm—Hoffmann & Baron LLP

(57) ABSTRACT

A button fastening device for attachment within an opening in a duct base for securing elongate cables and the like as well as structural duct dividers thereto. The device includes a cup-shaped upper portion, a shaft and a locking wing. The cup-shaped upper portion has a rim for snap-on attachment of a duct divider and strap passages for attachment of a bundle strap for securing cables to the duct base. The shaft extends from the cup-shaped upper portion to the locking wing. The locking wing secures the device to the duct base.

17 Claims, 9 Drawing Sheets